United States Patent
Maruyama et al.

(10) Patent No.: US 12,351,050 B2
(45) Date of Patent: Jul. 8, 2025

(54) STATION AND POWER SUPPLY DEVICE OF AUTONOMOUS TRAVEL WORK MACHINE

(71) Applicant: HONDA MOTOR CO., LTD., Tokyo (JP)

(72) Inventors: Shuhei Maruyama, Wako (JP); Kenta Kawanishi, Wako (JP); Fumio Minami, Wako (JP); Kouki Tsuruda, Wako (JP); Masashi Takeichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 529 days.

(21) Appl. No.: 17/788,109

(22) PCT Filed: Dec. 25, 2019

(86) PCT No.: PCT/JP2019/050999
§ 371 (c)(1),
(2) Date: Jun. 22, 2022

(87) PCT Pub. No.: WO2021/130939
PCT Pub. Date: Jul. 1, 2021

(65) Prior Publication Data
US 2023/0028981 A1    Jan. 26, 2023

(51) Int. Cl.
*B60L 53/50* (2019.01)
*B60L 53/14* (2019.01)
(Continued)

(52) U.S. Cl.
CPC ............. *B60L 53/30* (2019.02); *B60L 53/14* (2019.02); *H02J 7/02* (2013.01); *A47L 2201/02* (2013.01); *A47L 2201/022* (2013.01); *H02J 50/10* (2016.02)

(58) Field of Classification Search
CPC .................................................. A47L 2201/022
(Continued)

(56) References Cited

U.S. PATENT DOCUMENTS 5,629,602 A    5/1997  Makino
9,592,742 B1*  3/2017  Sosinov ................. B60L 53/68
(Continued)

FOREIGN PATENT DOCUMENTS

JP    H06-86121       3/1994
JP    7-104896 A      4/1995
(Continued)

OTHER PUBLICATIONS

Japanese Office Action dated Oct. 25, 2022 issued in corresponding Japanese application No. 2021-566667; English machine translation included (13 pages).
(Continued)

*Primary Examiner* — Drew A Dunn
*Assistant Examiner* — Ahmed H Omar
(74) *Attorney, Agent, or Firm* — Rankin, Hill & Clark LLP

(57) ABSTRACT

A station for a lawn mower for charging a storage battery included in the lawn mower that autonomously travels and perform specified work, the station including: a base that stores the lawn mower; and a power supply device that supplies electric power to the storage battery included in the lawn mower when the lawn mower is stored in the base, in which the power supply device or the base includes power supply means for supplying electric power from the power supply device to power receiving means for supplying received electric power to the storage battery included in the lawn mower, and the power supply device is attachable to and detachable from the base.

6 Claims, 7 Drawing Sheets

(51) Int. Cl.
*B60L 53/30* (2019.01)
*H02J 7/02* (2016.01)
*H02J 50/10* (2016.01)

(58) Field of Classification Search
USPC ......................................................... 320/108
See application file for complete search history.

(56) References Cited

U.S. PATENT DOCUMENTS

| | | |
|---|---|---|
| 2005/0224306 A1 | 10/2005 | Kosco |
| 2017/0285630 A1 | 10/2017 | Yamamura |
| 2018/0081366 A1* | 3/2018 | Tan ...................... G05D 1/0265 |
| 2018/0104829 A1* | 4/2018 | Altman ................. H01M 10/48 |
| 2018/0319286 A1 | 11/2018 | Greyson et al. |
| 2021/0165415 A1* | 6/2021 | Lee ........................ A01D 34/86 |

FOREIGN PATENT DOCUMENTS

| | | | |
|---|---|---|---|
| JP | 2017-176115 A | 10/2017 | |
| JP | 2017-182635 | 10/2017 | |
| WO | 2016/104187 | 6/2016 | |
| WO | 2016/174786 | 11/2016 | |
| WO | WO-2016174786 A1 * | 11/2016 | ............... G05D 1/02 |

OTHER PUBLICATIONS

International Search Report, Date of mailing: Mar. 3, 2020, 3 pages.
Written Opinion of the International Searching Authority dated Mar. 3, 2020 in PCT/JP2019,050999, 4 pages.
International Preliminary Report on Patentability, Date of mailing: Jul. 7, 2022, 6 pages.

* cited by examiner

STATION AND POWER SUPPLY DEVICE OF AUTONOMOUS TRAVEL WORK MACHINE

TECHNICAL FIELD

The present invention relates to a station and a power supply device of an autonomous travel work machine.

BACKGROUND ART

There are known power supply devices for charging a storage battery mounted on an autonomous travel work machine that autonomously travels and performs specified work (for example, see Patent Literature 1). This Patent Literature 1 discloses a configuration in which a power supply device for charging a robot lawn mower, which is a kind of autonomous travel work machine, and a base for storing the robot lawn mower are integrated with a station for the robot lawn mower.

CITATION LIST

Patent Literature

[Patent Literature 1]
Japanese Patent Laid-Open No. 2017-182635

SUMMARY OF INVENTION

Technical Problem

Stations for robot lawn mowers are mainly installed outdoors and thus are exposed to direct sunlight and rainwater. A station for a robot lawn mower is integrally provided with a power supply device, and thus in some cases, electronic parts and the like of the power supply device can be affected by high temperature due to direct sunlight and high humidity environment due to rainwater. For this reason, there is a possibility that the durability of the power supply device can decrease.

In addition, in the case in which the area where the robot lawn mower can travel is divided into a plurality of areas by roads or the like, as many stations as the number of divided areas are necessary, the stations of the areas except the one in which the robot lawn mower is working do not operate, and thus, it is difficult to operate the power supply devices provided in the stations efficiently.

In light of the above, an object of the present invention is to prevent a decrease in the durability of a power supply device of a station for an autonomous travel work machine due to exposure to direct sunlight and rainwater.

Another object is to efficiently operate a power supply device in the case in which the area where a robot lawn mower can travel is divided into a plurality of areas.

Solution to Problem

To achieve the above objects, a station for an autonomous travel work machine, the station being configured to charge a storage battery included in an autonomous travel work machine that autonomously travels and performs specified work, includes: a base that stores the autonomous travel work machine; and a power supply device that supplies electric power to the storage battery included in the autonomous travel work machine when the autonomous travel work machine is stored in the base, the power supply device or the base includes power supply means for supplying electric power from the power supply device to power receiving means for receiving electric power to be supplied to the storage battery, the power receiving means being included in the autonomous travel work machine, and the power supply device is attachable to and detachable from the base.

In the above configuration, the base may be one of a plurality of bases each of which the power supply device is attachable to.

In the above configuration, the base may include an input terminal of a signal transmission unit that transmits a signal detectable by the autonomous travel work machine, the power supply device may include an output terminal of a signal generation unit that generates a current that flows in the signal transmission unit, and connection between the input terminal and the output terminal may be released by removing the power supply device from the base.

In the above configuration, the signal transmission unit may be an area wire located along the periphery of an area in which the autonomous travel work machine is allowed to travel.

In the above configuration, the signal transmission unit may be a station wire provided in the base and configured to guide the autonomous travel work machine to a position at which the autonomous travel work machine receives electric power supply from the power supply means.

In the above configuration, the power supply device may include a handle for a user to hold to carry the power supply device, and the handle may be movable between a fixing position at which the power supply device is fixed to the base and a carrying position at which fixation of the power supply device to the base is released.

In the above configuration, the power supply device may include a power supply, and electric power of the power supply may be supplied to the storage battery.

In the above configuration, the power supply device may be removed from the base by operation of an operating part to operate an engagement tool that engages the power supply device with the base or by removing, using a general-purpose tool, a fixation member for fixing the power supply device to the base.

A power supply device configured to be attached to a base for storing an autonomous travel work machine that autonomously travels and performs specified work includes power supply means for charging a storage battery of the autonomous travel work machine by supplying electric power to the storage battery via power receiving means included in the autonomous travel work machine, and the power supply device is attachable to and detachable from the base.

Advantageous Effects of Invention

For the power supply device according to the present invention, since the power supply device can be removed from the base and carried, the power supply device can be stored in a place where it is unlikely to be affected by the weather, and thus, it is possible to mitigate a decrease in the durability of the power supply device.

In addition, it is possible to efficiently operate a power supply device in the case in which the area where a robot lawn mower can travel is divided into a plurality of areas.

DESCRIPTION OF EMBODIMENTS

Hereinafter, an embodiment of the present invention will be described with reference to the drawings.

Figure 1:
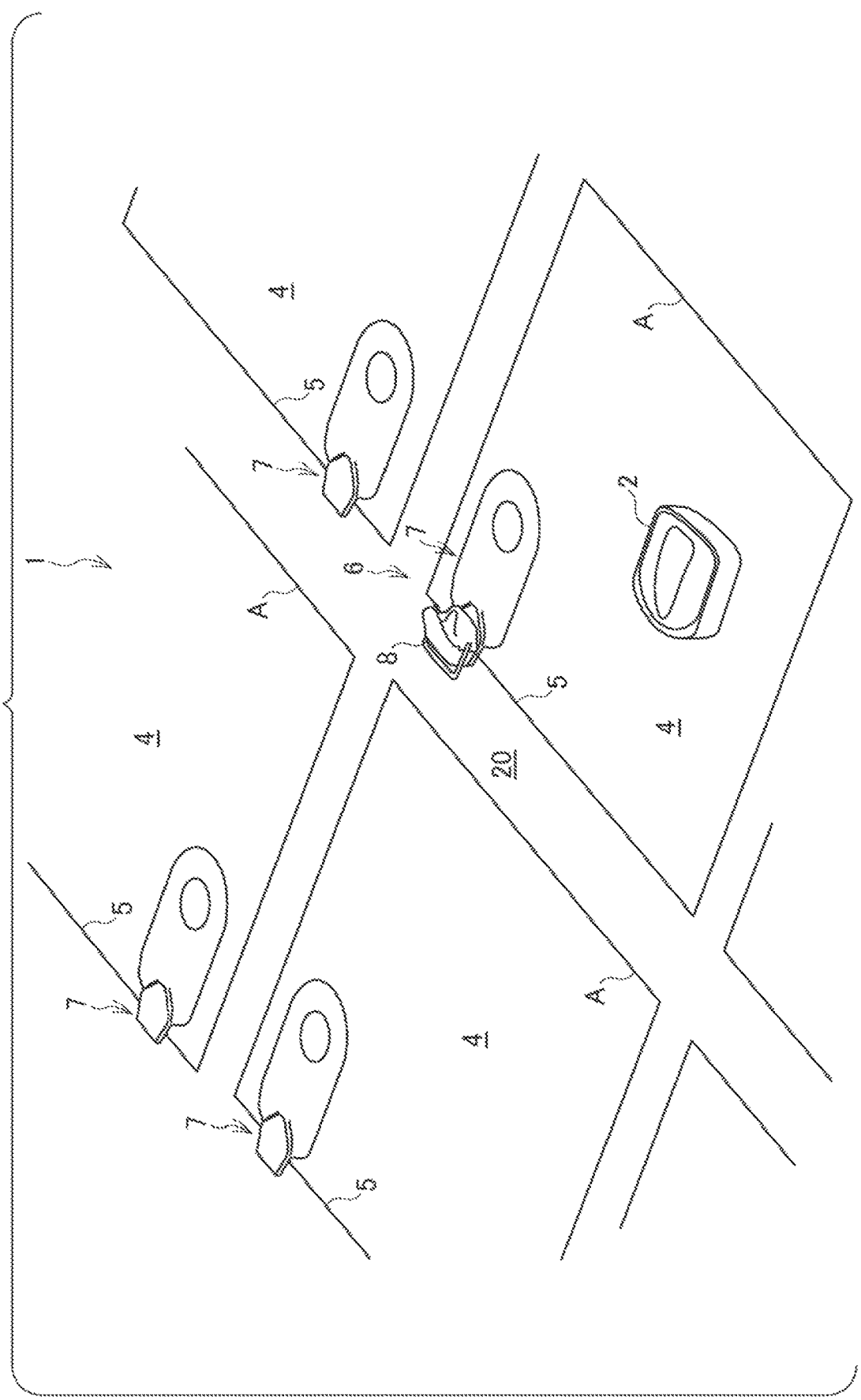
FIG. 1 is a diagram illustrating the configuration of an unattended lawn mowing system according to the present embodiment.
Figure 2:
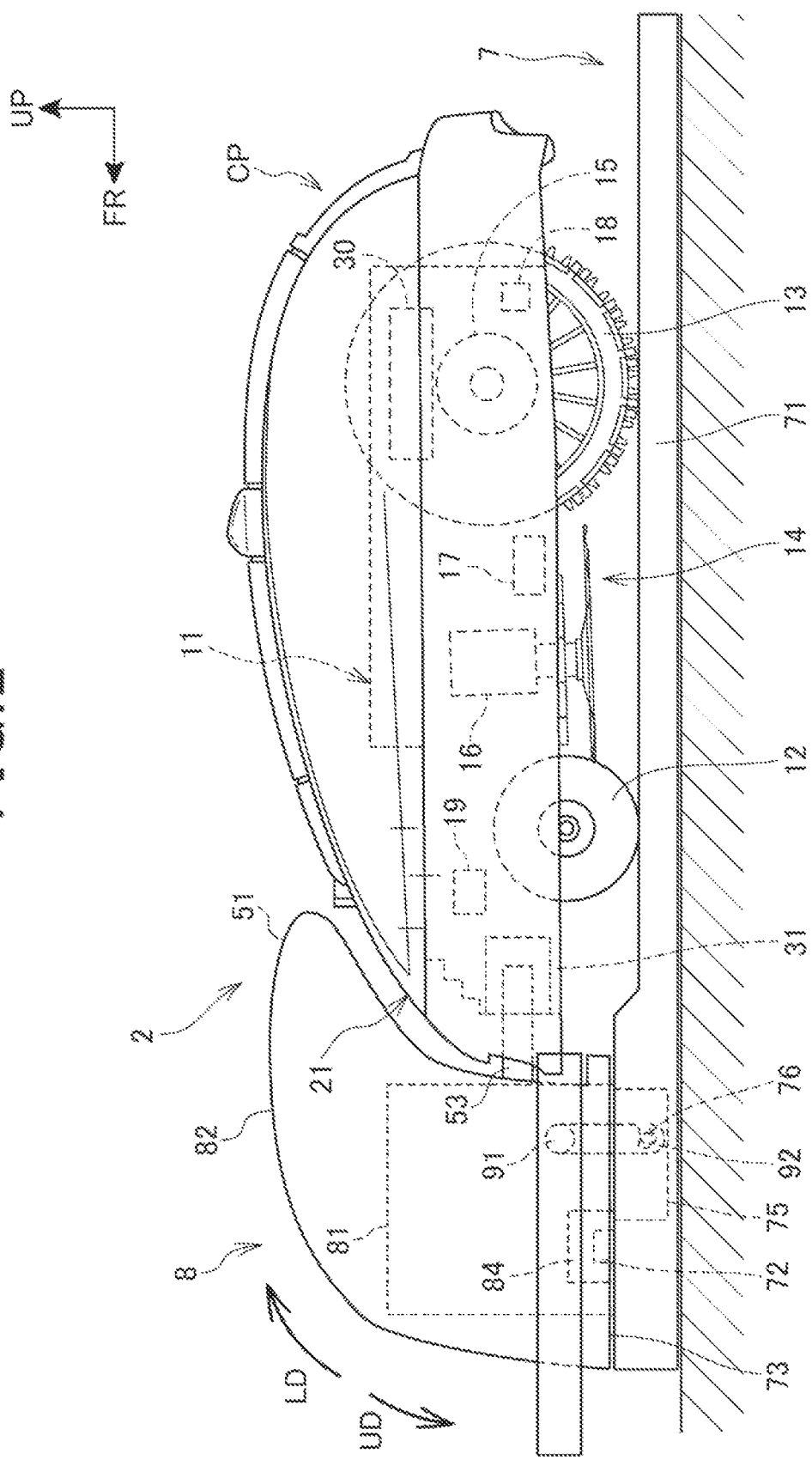
FIG. 2 is a diagram illustrating a lawn mower stored in a base with a power supply device attached to it.
Figure 3:
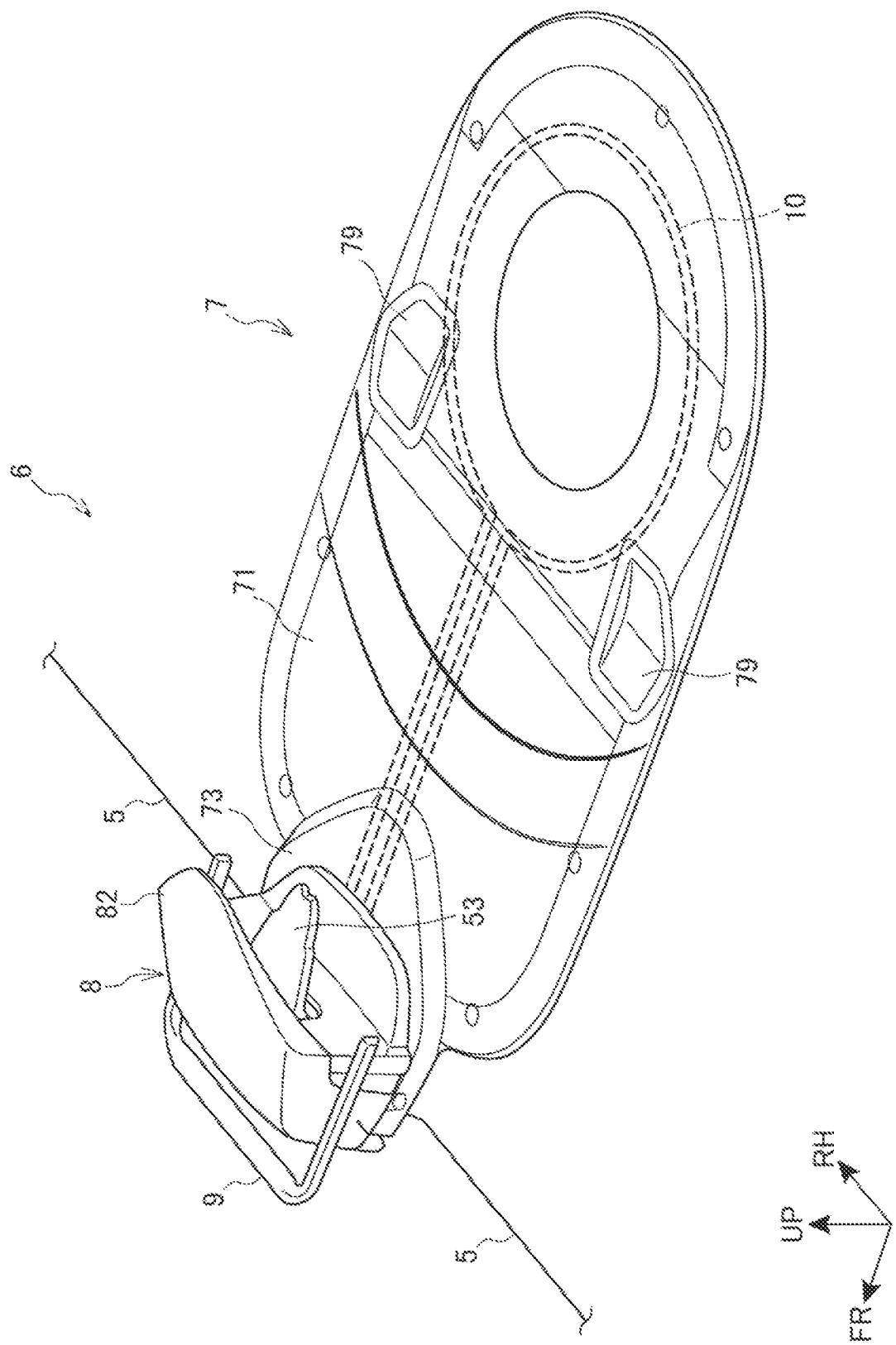
FIG. 3 is a perspective view of a station.
Figure 4:
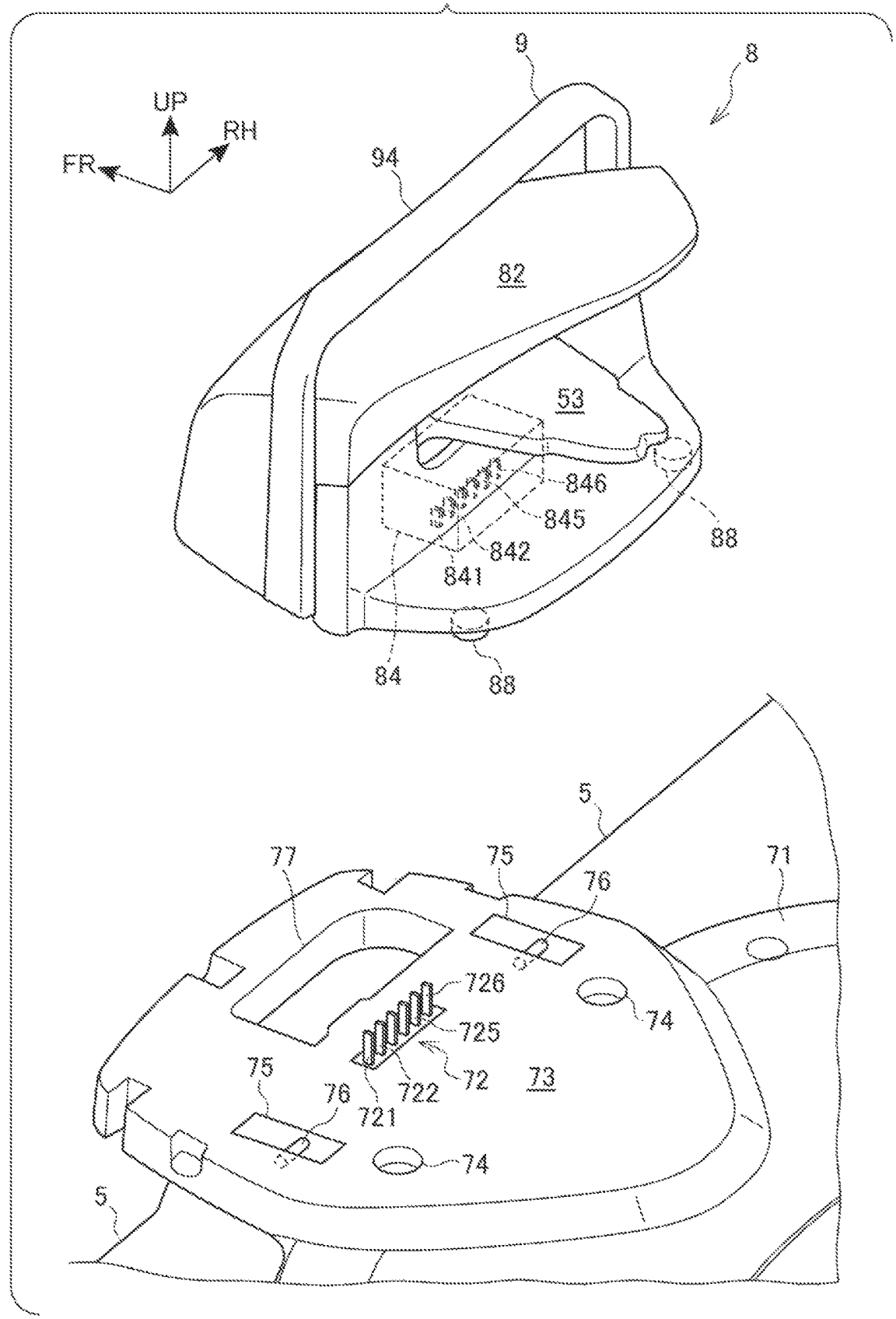
FIG. 4 is a perspective view of the power supply device removed from the base.
Figure 5:
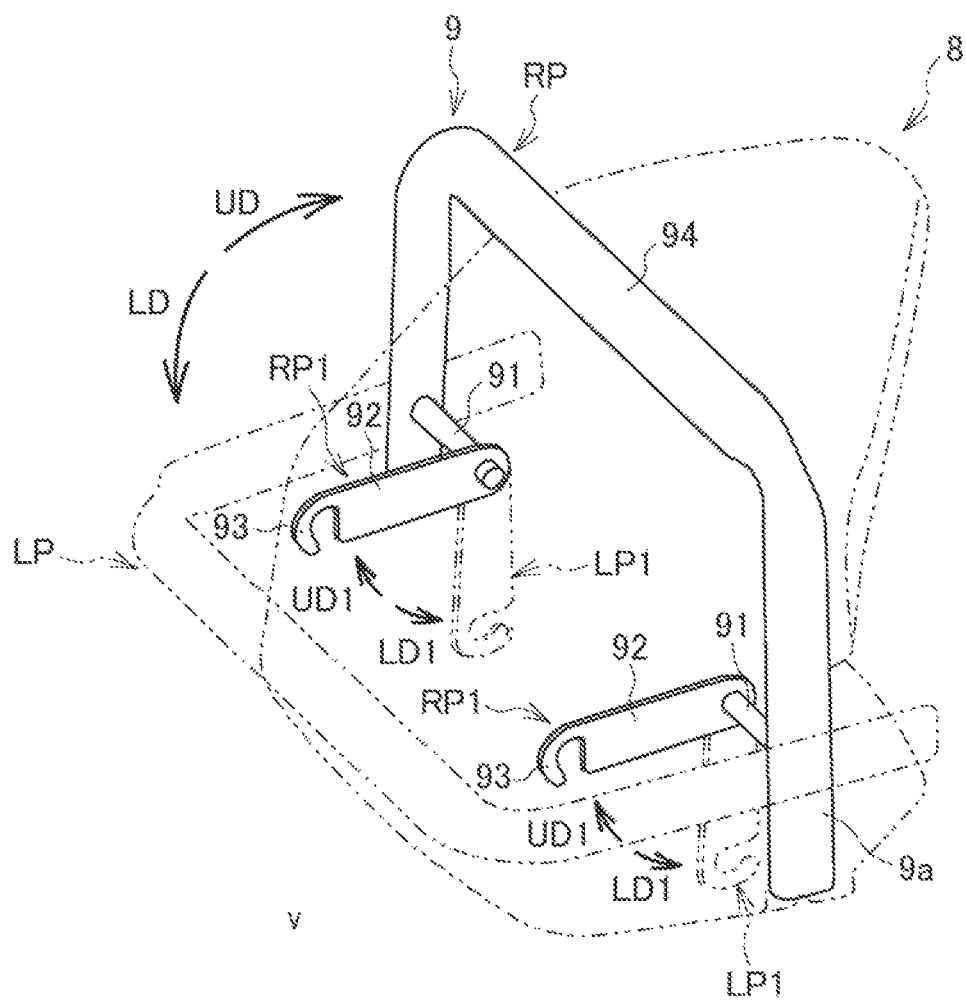
FIG. 5 is a perspective view of a handle of the power supply device.
Figure 6:
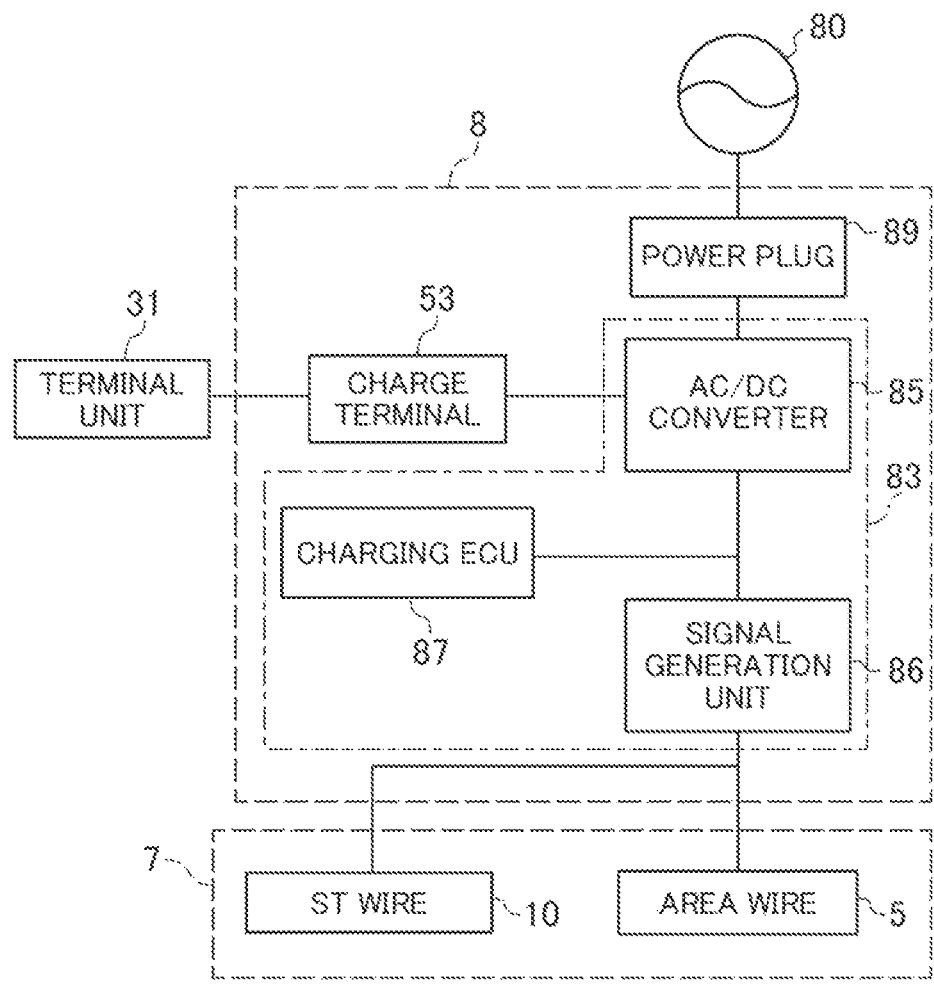
FIG. 6 is a block diagram illustrating the electrical configuration of the power supply device.

FIG. 1 is a diagram illustrating the configuration of an unattended lawn mowing system 1 according to the present embodiment. FIG. 2 is a diagram illustrating a lawn mower 2 stored in a base 7 with a power supply device 8 attached to it. FIG. 3 is a perspective view of a station 6. FIG. 4 is a perspective view of the power supply device 8 removed from the base 7. FIG. 5 is a perspective view a handle 9 of the power supply device 8. FIG. 6 is a block diagram illustrating the electrical configuration of the power supply device 8. In the figures, FR indicates the forward direction, UP the upward direction, and RH the right direction, and these correspond the forward direction, upward direction, and right direction of the robot lawn mower 2 being charged at the station 6.

The unattended lawn mowing system 1 includes the station 6 and the robot lawn mower 2 (hereinafter, the lawn mower 2).

The station 6 includes the base 7 that stores the lawn mower 2, and the power supply device 8 for charging the lawn mower 2. The configuration of the station 6 for the lawn mower 2 includes the power supply device 8 attached to the base 7.

The base 7 is located in a lawn mowing area 4 which is an area where the lawn mower 2 can travel, and the base 7 includes a plate-shaped base plate 71 on the upper surface of which the lawn mower 2 is placed.

The base plate 71 is fixed on the ground surface of the lawn mowing area 4 with the anchors or the like inserted in its peripheral portions. The base plate 71 includes a station wire 10 inside, and an end portion of the base plate 71 is connected to an area wire 5.

As illustrated in FIG. 3, the upper surface of the base plate 71 has hollows 79 recessed downward. The positions of the hollows 79 agree with the positions of rear wheels 13 when the lawn mower 2 is positioned at the charge position CP at which a storage battery 17 of the lawn mower 2 is charged by the power supply device 8. Since the rear wheels 13 enter the hollows 79, the lawn mower 2 is stabilized at the charge position CP.

The upper surface of the front end portion of the base plate 71 is provided with an attachment unit 73 to which the power supply device 8 is attached.

The attachment unit 73 has, at its center, a terminal unit 72 protruding upward. The terminal unit 72 includes terminals 721 and 726 serving as the input terminals of the area wire 5 and terminals 722 and 725 serving as the input terminals for the station wire 10.

The attachment unit 73 has recesses 75 extending in straight lines in the front-rear direction.

Each recess 75 has, in its inside, a pin 76 extending in the right-left direction.

The attachment unit 73 has insertion portions 74 which are holes extending downward. The insertion portions 74 are for positioning the power supply device 8 relative to the attachment unit 73.

Protrusions 88 provided on the bottom surface of a power-supply-device main body 81 are inserted into the insertion portions 74, and thereby, the power supply device 8 is positioned when the power supply device 8 is attached to the base 7.

The attachment unit 73 has a hole 77 having an approximately quadrangular shape. By holding a portion around this hole 77, it is easy to hold the base plate 71.

The area wire 5 is an electric wire and is a signal transmission unit that transmits a signal detectable by the lawn mower 2.

The area wire 5 is for setting an area in which the lawn mower 2 is allowed to travel and for defining the lawn mowing area 4. The area set by the area wire 5 corresponds to the lawn mowing area 4.

The area wire 5 is set along the periphery of the lawn mowing area 4, and the lawn mower 2 detects the boundary A of the lawn mowing area 4. The area wire 5 is connected to the both right and left sides of the front end portion of the base plate 71 and laid along the boundary A, and the area wire 5 generates a magnetic field by the electric power from an electric-power supply unit 83. The lawn mower 2, by detecting the magnetic field from the area wire 5, detects the boundary A of the lawn mowing area 4. For the method of generating a magnetic field from the area wire 5, an existing technique of generating a magnetic field detectable by the lawn mower 2 can be used. For example, a current having a constant voltage or a current that flows at a constant cycle may be used.

The station wire 10 is an electric wire and is a signal transmission unit that transmits a signal detectable by the lawn mower 2.

The station wire 10 is provided in the base 7, and guides the lawn mower 2 in the base 7 to the charge position CP at which the lawn mower 2 receives electric power supply from a charge terminal 53. The station wire 10 extends from the terminal unit 72 in a straight line along the extension direction of the base plate 71, forms a loop shape after extending in a straight line toward the end portion opposite from the terminal unit 72, and again extends in a straight line back to the terminal unit 72. The lawn mower 2 detects the station wire 10 with a sensor unit 19 in the same way as it detects the area wire 5 and thus can be positioned at the charge position CP.

Although a magnetic field is used as the signal generated by the station wire 10 and the area wire 5, alternatively, radio waves detectable by the lawn mower 2 may be used.

By the way, there are cases in which the area where the lawn mower 2 can travel is divided by passages 20 or the like as illustrated in FIG. 1. In such a case, the lawn mowing area 4 is set for each area where the lawn mower 2 can continue to travel, and the base 7 is provided for each lawn mowing area 4.

The plurality of bases 7 are configured such that the power supply device 8 can be attached to and detached from each of them.

The power supply device 8 can be removed from the base 7 and carried.

The power supply device 8 is attached to the base 7 located at the lawn mowing area 4 where lawn mowing is to be performed. With this, the station 6 is set at the lawn mowing area 4 where lawn mowing is to be performed.

After lawn mowing work is finished for one lawn mowing area 4, if lawn mowing work is performed for the next lawn mowing area 4, the user carries the power supply device 8 and attaches it to the base 7 of the corresponding lawn mowing area 4.

In the case in which the area where the lawn mower 2 can travel is divided, since the base 7 is located at each lawn mowing area 4, and one power supply device 8 is shared by the plurality of bases 7, it is possible to configure an unattended lawn mowing system 1 more economically than in the case in which a power supply device 8 is provided for each lawn mowing area 4.

The power supply device 8 includes the power-supply-device main body 81 and a power plug 110.

The power-supply-device main body 81, which is connected to a commercial power supply 80 via the power plug 110, converts the electric power from the commercial power supply 80 into electric power for charging the lawn mower 2 and supplies to the electric power to the charge terminal 53.

The power-supply-device main body 81 includes the electric-power supply unit 83 that generates electric power to be supplied to the lawn mower 2, the charge terminal 53 serving as power supply means for supplying electric power from the electric-power supply unit 83 to a terminal unit 31 of the lawn mower 2, and a connector 84 that connects to the terminal unit 72 of the base 7.

The electric-power supply unit 83, as illustrated in FIG. 6, includes an AC/DC converter 85, a charging electronic control unit 87 (hereinafter a charging ECU 87), and a signal generation unit 86.

The AC/DC converter 85 converts the alternating current sent from the commercial power supply 80 into a direct current while stepping down the voltage to an appropriate one, sends it to the charge terminal 53, and charges the storage battery 17 of the lawn mower 2 via the terminal unit 31.

The output of the AC/DC converter 85 is supplied to the signal generation unit 86 and the charging ECU 87, and the charging ECU 87 controls the electric power that is supplied to the charge terminal 53. Note that the charging ECU 87 may communicate with a control unit 30 of the lawn mower 2 to control that electric power that is supplied to the charge terminal 53.

In the above configuration, instead of the commercial power supply 80 and the AC/DC converter 85, a battery may be used. For example, a battery having a voltage and electric capacity capable of operating the signal generation unit 86 and the charging ECU 87 may be used. In the case of using a battery in the power supply device 8, the power supply device 8 does not need to be connected to a commercial power supply, and this makes work to attach the power supply device 8 to the base 7 easy. In addition, the unattended lawn mowing system 1 can be set at a place where there is no commercial power supply available in the surroundings.

The charging ECU 87 controls the operation of the signal generation unit 86.

The signal generation unit 86 converts the direct current with an appropriate voltage stepped down by the AC/DC converter 85 into a specified signal according to the instruction from the charging ECU 87 and, when terminals 841 and 846 serving as output terminals are connected to the terminals 721 and 726 serving as the input terminals of the area wire 5, energizes the area wire 5.

The signal generation unit 86, when terminals 842 and 845 serving as output terminals are connected to terminals 722 and 725 serving as input terminals of the station wire 10, energizes the station wire 10. Note that the signal generation unit 86 is connected to the area wire 5 and the station wire 10 by connecting the connector 84 and the terminal unit 72. In the case in which the signals that flow in the area wire 5 and the station wire 10 are currents with constant voltages, the signal generation unit 86 may be eliminated, and the AC/DC converter 85 may run currents to the area wire 5 and the station wire 10.

The charge terminal 53 supplies electric power to the terminal unit 31 that charges the storage battery 17.

The charge terminal 53 has a positive side terminal and a negative side terminal for charging the storage battery 17.

When the lawn mower 2 is positioned at the charge position CP, the charge terminal 53 is inserted in the terminal unit 31. With this operation, each terminal of the charge terminal 53 comes in contact with and gets electrically connected to the corresponding terminal of the terminal unit 31. The electric power from the power supply device 8 is supplied to the terminal unit 31 through the charge terminal 53. The electric power received by the terminal unit 31 is supplied to the storage battery 17 and charges the storage battery 17. The method of supplying electric power from the power supply device 8 to the lawn mower 2 is not limited to the one described above in which the charge terminal 53 comes in contact with the terminal unit 31, but wireless power supply may be used for the method. For example, the charge terminal 53 may include a power supply coil, the terminal unit 31 may include a power receiving coil, and electric power may be supplied from the power supply device 8 to the lawn mower 2 by electromagnetic-induction wireless power supply. In this case, the lawn mower 2 is configured such that the storage battery 17 can be charged by electric power from the power receiving coil.

The power supply device 8 further includes a cover 82 and the handle 9.

The cover 82 covers the power-supply-device main body 81 and extends rearward so as to cover the front portion of the lawn mower 2 positioned at the charge position CP.

The handle 9 includes two arm portions 9a and a grip portion 94 connecting the arm portions 9a. Both arm portions 9a and 9a of the handle 9 each have a support shaft 91. Each support shaft 91 is rotatably supported by the power-supply-device main body 81.

The support shafts 91 extend from the arm portions 9a such that the support shafts 91 are directed toward each other, and each support shaft 91 is integrally provided with an engagement tool 92.

The engagement tool 92 extends in a direction orthogonal to the arm portion 9a and has a hook 93 at its distal end.

The engagement tools 92 provided on the handle 9 are for fixing the power supply device 8 to the base 7, and the hooks 93 of the engagement tools 92 are engaged with the respective pins 76 of the base 7.

The lawn mower 2 is an autonomous travel work machine that autonomously travels within the lawn mowing area 4, which is an area where the lawn mower 2 can travel, and mows the lawn. The lawn mower 2 is an example of an autonomous travel work machine or a self-propelled work machine that autonomously travels and perform specified work.

As illustrated in FIG. 2, the lawn mower 2 includes a vehicle body 11 having a traveling function and the like and a vehicle cover 21 that covers the vehicle body 11. The vehicle body 11 has right and left front wheels 12 at its lower front portions that can be steered to the right and left, the right and left rear wheels 13 at its lower rear portions that function as right and left drive wheels, and a work unit 14 at its lower center portion.

The lawn mower 2 includes the terminal unit 31 at its front portion that receives electric power from the charge terminal 53 of the power supply device 8.

The vehicle body 11 includes the storage battery 17 that functions as a power supply for supplying operating electric power to each unit of the lawn mower 2, right and left traveling motors 15 that individually drive the right and left rear wheels 13, a work-unit drive motor 16 that drives the work unit 14, wheel-speed sensors 18 that detect the rotation speeds of the right and left rear wheels 13 serving as drive wheels, a sensor unit 19 for detecting the area wire 5 and the like, and the control unit 30 that controls each unit of the lawn mower 2.

The control unit 30 controls travel of the lawn mower 2 by controlling drive of the traveling motors 15 and performs specified work by controlling drive of the work-unit drive motor 16. The work unit 14 is a cutting-blade disk having cutting blades and is capable of performing lawn mowing work by the cutting-blade disk being rotationally driven.

This control unit 30 determines the position of the lawn mower 2 based on the results of detecting the wheel-speed sensors 18 and the sensor unit 19 and, based on the determined position, controls travel of the lawn mower 2. With this configuration, the lawn mower 2 can travel so as to appropriately mow the lawn in the lawn mowing area 4 and move to the station 6 after finishing lawn mowing work. The control unit 30 may be configured to be capable of communicating with the power supply device 8. For example, the control unit 30 may receive a beacon signal, a signal including information on non-travelable areas in the lawn mowing area 4, or the like, transmitted by the power supply device 8.

The lawn mower 2 travels in the lawn mowing area 4 and mows the lawn by using the electric power of the storage battery 17. When the amount of electricity of the storage battery 17 of the lawn mower 2 becomes smaller than a specified amount, the lawn mower 2 returns to the station 6, fits in the base 7, and connects the terminal unit 31 to the charge terminal 53 to charge the storage battery 17. When the storage battery 17 is charged, the lawn mower 2 resumes lawn mowing. When lawn mowing for the lawn mowing area 4 is finished, the lawn mower 2 returns to the station 6.

For the configuration of the lawn mower 2, the configurations of known robot lawn mowers may be widely employed. For example, for techniques to determine the lawn mowing area 4, the station 6, the current position, and the like, techniques using position detection devices such as a GPS and a gyro sensor, image recognition techniques using a camera, or the like may be employed.

Next, advantageous effects of the present embodiment will be described.

To attach the power supply device 8 to the base 7, the user holds the grip portion 94 of the handle 9 to carry the power supply device 8. In this state, the handle 9 is at the carrying position RP at which the grip portion 94 is oriented upward, and the engagement tools 92 are at the position RP1 at which the engagement tools 92 extend in the horizontal direction.

When the user, while holding the handle 9, places the power supply device 8 on the upper surface of the attachment unit 73, the protrusions 88 of the power-supply-device main body 81 are inserted into the insertion portions 74 of the attachment unit 73, and the power supply device 8 is positioned relative to the attachment unit 73.

After the power supply device 8 is placed on the attachment unit 73, the grip portion 94 of the handle 9 is rotated in the direction LD which is a downward direction, and thereby the engagement tools 92 are rotated in the LD1 direction in which the engagement tools 92 are directed toward the base 7. With this operation, the hooks 93 of the engagement tools 92 are engaged with the pins 76, and the power supply device 8 is fixed to the base 7.

In other words, the handle 9 also serves as an operating part that moves the engagement tools 92 for engaging the power supply device 8 with the base 7 to a non-engagement position, and thus, by operating this operating part, it is possible to remove the power supply device 8 from the base 7 without using a dedicated tool.

In the state in which the power supply device 8 is fixed to the base 7, the handle 9 is at the fixing position LP at which the grip portion 94 is close to the base 7. At the fixing position LP, the grip portion 94 is on the front side of the support shaft 91 and at approximately the same height as the support shaft 91, and thus, the handle 9 does not hinder movement of the lawn mower 2 to the charge position CP.

When the handle 9 is at the fixing position LP, the engagement tools 92 are at the position LP1 at which the engagement tools 92 extend downward from the support shafts 91, the hooks 93 are engaged with the pins 76, restricting upward movement of the power supply device 8. In addition, movement of the power supply device 8 in the horizontal direction is restricted because the protrusions 88 are inserted in the insertion portions 74.

For the engagement structure including the engagement tool 92, other known engagement structures may be employed, and the operating part for moving this kind of engagement tool 92 to the non-engagement position is also not limited to the handle 9, but other known operating parts, such as an operation lever and a push button, may be employed. In addition, the configuration is not limited the one in which this kind of operating part is provided in the power supply device 8, but an operating part may be provided on the base 7 or other portions.

By attaching the power supply device 8 to the base 7, the connector 84 is connected to the terminal unit 72. In this state, the area wire 5 and the station wire 10 can transmit signals with electric power supplied from the power supply device 8.

The connection between the connector 84 and the terminal unit 72 is achieved by the terminals 841, 842, 845, and 846 included in the connector 84 respectively coming in contact with the terminals 721, 722, 725, and 726 included in the terminal unit 72. With this configuration, connection and release between the connector 84 and the terminal unit 72 can be easily achieved by attaching or detaching the power supply device 8 to or from the base 7.

To remove the power supply device 8 from the base 7, the user holds the grip portion 94 of the handle 9 which is at the fixing position LP and rotates the grip portion 94 in the direction UD which is the direction for upward rotation.

With this operation, the handle 9 moves to the carrying position RP, and the engagement tools 92 move to the position RP1. When the handle 9 moves to the carrying position RP, the engagement between the hooks 93 and the pins 76 is released, and fixation of the power supply device 8 to the base 7 is released. This allows the power supply device 8 to be carried, and the power supply device 8 can be carried to another base 7.

As described above, the handle 9 is configured to be movable between the fixing position LP and the carrying position RP relative to the power-supply-device main body

81. Thus, operation of fixing the power-supply-device main body 81 to the base 7 and operation of releasing the fixation can easily be performed by holding the handle 9.

Since positioning the grip portion 94 upward allows the power supply device 8 to be carried, fixation of the power supply device 8 to the base 7 can be released by lifting up the grip portion 94, and thus operation of carrying the power supply device 8 is smooth.

As has been described above, the station 6 for an autonomous travel work machine according to the present embodiment is a station 6 for a lawn mower 2, the station 6 being configured to charge a storage battery 17 included in a lawn mower 2 that autonomously travels and performs specified work, the station 6 including: a base 7 that stores the lawn mower 2; and a power supply device 8 that supplies electric power to the storage battery 17 included in the lawn mower 2 when the lawn mower 2 is stored in the base 7, in which the power supply device 8 includes a charge terminal 53 serving as power supply means for supplying electric power from the power supply device 8 to a terminal unit 31 serving as power receiving means for receiving electric power to be supplied to the storage battery 17 included in the lawn mower 2, or the base 7 includes a power supply coil 101 for supplying electric power from the power supply device 8 to a power receiving coil 102, and the power supply device 8 is attachable to and detachable from the base 7.

For this station 6 for the lawn mower 2, since the power supply device 8 can be removed from the base 7 and stored indoors, it is possible to reduce the effects of the weather on the power supply device 8 such as high temperature due to direct sunlight and high humidity due to rainwater. In addition, since the power supply device 8 can be removed for storage, it is possible to reduce the possibility that the power supply device 8 may be stolen.

The power supply device 8 can be attached to each of a plurality of bases 7.

Thus, in the case in which there are a plurality of lawn mowing areas 4, a common power supply device 8 can be used for these areas. Thus, it is possible to reduce cost related to the installation of the station 6, compared to the case of installing a plurality of stations having a conventional structure. In addition, it is possible to increase the operating ratio of the power supply device 8 and efficiently operate the power supply device 8.

The base 7 includes the terminals 721 and 726 which are the input terminals of the area wire 5 serving as the signal transmission unit that transmits a signal detectable by the lawn mower 2, and the base 7 also includes the terminals 722 and 725 which are the input terminals of the station wire 10. The power supply device 8 includes the terminals 841 and 846 which are the output terminals of the signal generation unit 86 that generates a current that flows in the area wire 5, and the power supply device 8 also includes the terminals 842 and 845 which are the output terminals of the signal generation unit 86 that generates a current that flows in the station wire 10. Thus, removing the power supply device 8 from the base 7 releases the connection between the terminals 721 and 726 and the terminals 841 and 846 and the connection between the terminals 722 and 725 and the terminals 842 and 845.

This configuration makes it easy to attach and detach the power supply device 8 to and from the base 7, making it easy to carry the power supply device 8.

The area wire 5 serving as a signal transmission unit is located along the periphery of the lawn mowing area 4 in which the lawn mower 2 is allowed to travel.

With this configuration, the work to attach and detach the power supply device 8 to and from the base 7 provided with the area wire 5 is easy, and thus it is easy to carry the power supply device 8.

The station wire 10 serving as a signal transmission unit is provided in the base 7 and guides the lawn mower 2 to the charge position CP at which the lawn mower 2 receives electric power supply from the charge terminal 53 serving as power supply means.

With this configuration, the work to attach and detach the power supply device 8 to and from the base 7 provided with the station wire 10 is easy, and thus it is easy to carry the power supply device 8.

The power supply device 8 includes the handle 9 for the user to hold to carry the power supply device 8, and the handle 9 is movable between the fixing position LP for fixing the power supply device 8 to the base 7 and the carrying position RP for releasing the fixation of the power supply device 8 to the base 7.

Thus, with the handle 9, operation of attaching and detaching of the power supply device 8 is easy.

The power supply device 8 includes the battery 89 serving as a power supply and supplies the electric power of the battery 89 to the storage battery 17.

With this configuration, it is possible to provide the station 6 to a lawn mowing area 4 around which there is no commercial power supply. Since no wiring between the power supply device 8 and a commercial power supply is necessary, the work of detaching the power supply device 8 is easy.

The power supply device 8 is removed from the base 7 by operation of the handle 9 serving as an operating part to operate the engagement tool 92 that engages the power supply device 8 with the base 7 and or removing, using a general-purpose tool, a fixation member for fixing the power supply device 8 to the base 7.

This configuration makes it easy to attach and detach the power supply device 8 to and from the base 7, making it easy to carry the power supply device 8.

The power supply device 8 is a power supply device 8 configured to be attached to a base 7 that stores a lawn mower 2 which is an autonomous travel work machine that autonomously travels and performs specified work, the power supply device 8 including a charge terminal 53 serving as power supply means for charging the storage battery 17 by supplying electric power to the storage battery 17 of the lawn mower 2 via a terminal unit 31 serving as power receiving means included in the lawn mower 2, in which the power supply device 8 is attachable to and detachable from the base 7.

With this power supply device 8, it is possible to remove the power supply device 8 from the base 7 and store it indoors, and thus possible to reduce the effects of the weather or the like on the power supply device 8. This configuration also reduces the possibility of being stolen.

The power supply device 8 can be removed for storage, it is possible to keep the contact surfaces of the charge terminal 53 and the terminal unit 31 in a favorable state.

In the case in which the number of bases 7 is two or more, the power supply device 8 is attached to the base 7 located in the area where the lawn is to be mowed, and thus, the power supply device 8 can be operated efficiently.

Next, modification examples of the station 6 and the power supply device 8 in the present embodiment will be described.

Figure 7:
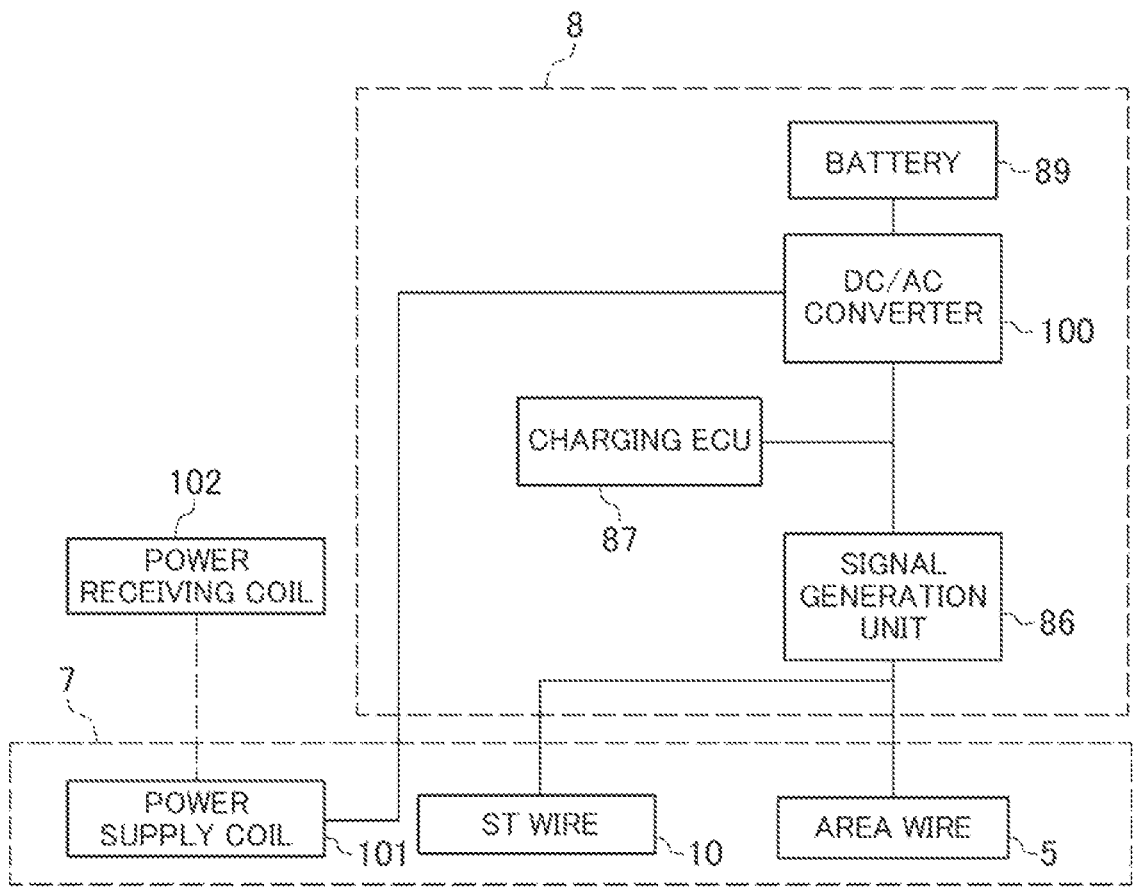
FIG. 7 is a block diagram of the electrical configuration of a modification example of the power supply device according to the present embodiment.

FIG. 7 is a block diagram illustrating the electrical configuration of the power supply device 8 and the base 7 of a modification example of the embodiment.

The power supply device 8 includes a battery 89, a DC/AC converter 100, a charging ECU 87, a signal generation unit 86, and a power supply coil 101.

The DC/AC converter 100 converts the direct current sent from the battery 89 into an alternating current having an appropriate voltage and sends the alternating current to the power supply coil 101 serving as power supply means for supplying power to the lawn mower 2 included in the base 7.

The power supply coil 101 supplies electric power by electromagnetic induction to the power receiving coil 102 serving as power receiving means included in the lawn mower 2, thereby charging the storage battery 17 of the lawn mower 2.

The power supply coil 101 and the DC/AC converter 100 are connected by connecting the foregoing the terminal unit 72 and connector 84. The terminal unit 72 includes the input terminals of the power supply coil 101, and the connector 84 includes the output terminals of the DC/AC converter 100 that supplies electric power to the power supply coil 101. By attaching the power supply device 8 to the base 7, the input terminals of the power supply coil 101 and the output terminals of the DC/AC converter 100 are brought in contact with and connected to one another.

The electric power of the battery 89 is supplied to the charging ECU 87 and the signal generation unit 86.

The signal generation unit 86 converts the direct current supplied from the battery 89 into a specified current and energizes the area wire 5 and the station wire 10. Then, the area wire 5 and the station wire 10 each generate a magnetic field detectable by the lawn mower 2. For the battery 89, a primary cell or a storage battery may be used.

Since the base 7 includes the power supply coil 101, positioning of the lawn mower 2 relative to the power supply device 8 is not necessary for charging, and this makes the configuration of the power supply device 8 simpler.

Since the lawn mower 2 can be charged from the base 7, it is possible to mitigate the accuracy in attachment of the power supply device 8 to the base 7, and this makes it easy to manufacture the power supply device 8 and the base 7.

Since the power supply coil 101 is provided in the base 7, it is possible to reduce the effects of the weather or the like on the power supply coil 101.

In addition, since the degree of freedom in the position of the lawn mower 2 on the base 7 is high, it is possible to mitigate the accuracy in the position of the lawn mower 2 to be charged, making it easy to charge the lawn mower 2.

Each embodiment described above is merely an aspect of the present invention, and thus modifications and applications are possible in any manner within a scope not departing from the spirit of the present invention.

For example, in the foregoing embodiment, known methods may be used for the method of attaching and detaching the power supply device 8 to and from the base 7.

For the method of charging the storage battery 17 of the lawn mower 2, known charging methods can be widely employed in addition to a contact method and an electromagnetic induction method as above.

For detection of the lawn mowing area 4, the station 6, the current position, and the like, for example, the area wire 5 and the station wire 10 may be eliminated by employing position detection devices such as a GPS, a gyro sensor, or the like.

REFERENCE SIGNS LIST 2 lawn mower
4 lawn mowing area
5 area wire
7 base
8 power supply device
9 handle
10 station wire
17 storage battery
31 terminal unit (power receiving means)
53 charge terminal (power supply means)
72 terminal unit
81 power-supply-device main body
89 battery
101 power supply coil (power supply means)
102 power receiving coil (power receiving means)
CP charge position
LP fixing position
RP carrying position

The invention claimed is:

1. A station for an autonomous travel work machine, the station being configured to charge a storage battery included in an autonomous travel work machine that autonomously travels and performs specified work, the station comprising:
   a base that stores the autonomous travel work machine; and
   a power supply device that supplies electric power to the storage battery included in the autonomous travel work machine when the autonomous travel work machine is stored in the base, wherein
   the power supply device or the base includes;
   a charge terminal for supplying electric power from the power supply device to a power receiving terminal for receiving electric power for charging the storage battery, the power receiving terminal being included in the autonomous travel work machine,
   the power supply device is attachable to and detachable from the base,
   a station wire configured to guide the autonomous travel work machine to a position at which the autonomous travel work machine receives electrical power supply from the charge terminal is provided in the base,
   the base includes an input terminal of the station wire,
   the power supply device includes a station wire output terminal that outputs a current that is to flow in the station wire,
   the input terminal of the station wire is connected to the station wire output terminal by attaching the power supply device to the base, and
   connection between the input terminal of the station wire and the station wire output terminal is released by removing the power supply device from the base.

2. The station according to claim 1, wherein the base is one of a plurality of bases each of which the power supply device is attachable to.

3. The station according to claim 1, wherein an area wire that is located along a periphery of an area in which the autonomous travel work machine is allowed to travel and that transmits a signal detectable by the autonomous travel work machine is connected to the base, and the base includes an input terminal of the area wire,
the power supply device includes an area wire output terminal that outputs a current that is to flow in the area wire, the input terminal of the area wire is connected to the area wire output terminal by attaching the power supply device to the base, and connection between the input terminal of the area wire and the area wire output terminal is released by removing the power supply device from the base.

4. The station according to claim 1, wherein the power supply device includes a handle for a user to carry the power supply device, and the handle is movable between a fixing position at which the power supply device is fixed to the base and a carrying position at which fixation of the power supply device to the base is released.

5. The station according to claim 1, wherein the power supply device is removed from the base by operation of an operating part to operate an engagement tool that engages the power supply device with the base or by removing, using a general-purpose tool, a fixation member for fixing the power supply device to the base.

6. A power supply device configured to be attached to a base for storing an autonomous travel work machine that autonomously travels and performs specified work, the power supply device comprising a charge terminal for charging a storage battery of the autonomous travel work machine by supplying electric power to the storage battery via a power receiving terminal included in the autonomous travel work machine, wherein the power supply device is attachable to and detachable from the base, the power supply device includes a station wire output terminal that outputs a current that is to flow in a station wire which is provided in the base and which is configured to guide the autonomous travel work machine to a position at which the autonomous travel work machine receives electric power supply from the charge terminal, an input terminal of the station wire is connected to the station wire output terminal by attaching the power supply device to the base, the input terminal of the station wire being provided to the base, and connection between the input terminal of the station wire and the station wire output terminal is released by removing the power supply device from the base.

* * * * *